US011615757B2

United States Patent
Amari

(10) Patent No.: US 11,615,757 B2
(45) Date of Patent: Mar. 28, 2023

(54) LIQUID CRYSTAL DISPLAY DEVICE AND ELECTRONIC APPARATUS FOR PREVENTING LIQUID CRYSTAL DRIVE VOLTAGE FROM LOWERING

(71) Applicant: SONY CORPORATION, Tokyo (JP)

(72) Inventor: Koichi Amari, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/052,764

(22) PCT Filed: Apr. 24, 2019

(86) PCT No.: PCT/JP2019/017389
§ 371 (c)(1),
(2) Date: Nov. 3, 2020

(87) PCT Pub. No.: WO2019/220894
PCT Pub. Date: Nov. 21, 2019

(65) Prior Publication Data
US 2021/0183325 A1   Jun. 17, 2021

(30) Foreign Application Priority Data

May 15, 2018   (JP) .............................. JP2018-093468

(51) Int. Cl.
*G09G 3/36* (2006.01)

(52) U.S. Cl.
CPC ......... *G09G 3/3614* (2013.01); *G09G 3/3648* (2013.01); *G09G 2300/0842* (2013.01)

(58) Field of Classification Search
CPC .............. G09G 3/3614; G09G 3/3648; G09G 2300/0842
See application file for complete search history.

(56) References Cited

U.S. PATENT DOCUMENTS 6,043,812 A * 3/2000 Utsunomiya ........ G09G 3/3688
345/100
6,456,267 B1   9/2002 Sato et al.
(Continued)

FOREIGN PATENT DOCUMENTS

CN   1490877 A    4/2004
JP   11-160676 A   6/1999
(Continued)

OTHER PUBLICATIONS

International Search Report and Written Opinion of PCT Application No. PCT/JP2019/017389, dated Jul. 16, 2019, 09 pages of ISRWO.

*Primary Examiner* — Kwang-Su Yang
(74) *Attorney, Agent, or Firm* — Chip Law Group

(57) ABSTRACT

A liquid crystal display device according to the present disclosure includes: a liquid crystal unit including a pixel electrode, a counter electrode facing the pixel electrode, and a liquid crystal layer sealed between the pixel electrode and the counter electrode; a first writing circuit configured to write a positive polarity video signal among video signals whose polarity changes periodically; and a second writing circuit configured to write a negative polarity video signal among the video signals whose polarity changes periodically. The liquid crystal unit, the first writing circuit, and the second writing circuit are provided for each pixel. The first writing circuit and the second writing circuit include transistors having conductivity types different from each other.

8 Claims, 11 Drawing Sheets

(56) References Cited

U.S. PATENT DOCUMENTS

| | | | | |
|---|---|---|---|---|
| 6,628,258 | B1* | 9/2003 | Nakamura | G02F 1/1362 |
| | | | | 345/98 |
| 8,237,644 | B2* | 8/2012 | Morvan | G09G 3/3659 |
| | | | | 345/87 |
| 8,847,872 | B2* | 9/2014 | Tseng | G09G 3/3614 |
| | | | | 345/99 |
| 2004/0070560 | A1* | 4/2004 | Matsumura | G09G 3/3648 |
| | | | | 345/90 |
| 2004/0169798 | A1* | 9/2004 | Iwasa | G02F 1/136277 |
| | | | | 349/113 |
| 2007/0252780 | A1* | 11/2007 | Lebrun | G09G 3/3648 |
| | | | | 345/55 |
| 2014/0307190 | A1* | 10/2014 | Tomikawa | G09G 3/3648 |
| | | | | 349/33 |
| 2018/0211611 | A1* | 7/2018 | Kato | G02F 1/134309 |

FOREIGN PATENT DOCUMENTS

| | | | | |
|---|---|---|---|---|
| JP | 2000-227782 A | | 8/2000 | |
| JP | 2002-082659 A | | 3/2002 | |
| JP | 2002082659 A | * | 3/2002 | ......... G09G 3/3614 |
| JP | 2004-163903 A | | 6/2004 | |
| JP | 2010-231179 A | | 10/2010 | |
| JP | 2015-161836 A | | 9/2015 | |
| KR | 10-2004-0025599 A1 | | 3/2004 | |
| KR | 10-0635191 B1 | | 12/2006 | |
| TW | 459158 B | | 10/2001 | |
| TW | 200405084 A | | 4/2004 | |

\* cited by examiner

WHITE DISPLAY (VA)

BLACK DISPLAY (VA)

WHITE DISPLAY (VA)

BLACK DISPLAY (VA)

LIQUID CRYSTAL DISPLAY DEVICE AND ELECTRONIC APPARATUS FOR PREVENTING LIQUID CRYSTAL DRIVE VOLTAGE FROM LOWERING

CROSS REFERENCE TO RELATED APPLICATIONS

This application is a U.S. National Phase of International Patent Application No. PCT/JP2019/017389 filed on Apr. 24, 2019, which claims priority benefit of Japanese Patent Application No. JP 2018-093468 filed in the Japan Patent Office on May 15, 2018. Each of the above-referenced applications is hereby incorporated herein by reference in its entirety.

TECHNICAL FIELD

The present disclosure relates to a liquid crystal display device and an electronic apparatus.

BACKGROUND ART

As one of liquid crystal display devices, there is a liquid crystal display device in which a video signal is alternately written in two systems of positive polarity and negative polarity for each pixel, and display driving is performed on the basis of the written video signals of the two systems. (See, for example, Patent Document 1).

CITATION LIST

Patent Document

Patent Document 1: Japanese Patent Application Laid-Open No. 2010-231179

SUMMARY OF THE INVENTION

Problems to be Solved by the Invention

In the prior art described in Patent Document 1 (Japanese Patent Application Laid-Open No. 2010-231179), two systems of writing circuits for alternately writing a positive polarity video signal and a negative polarity video signal are configured by transistors of the same conductivity type, specifically only N-channel MOS transistors. In this case, the voltage drop due to a threshold voltage $V_{th}$ of the N-channel MOS transistor has an influence, which leads to lowering of a liquid crystal drive voltage on the negative side.

Therefore, an object of the present disclosure is to provide a liquid crystal display device capable of preventing a liquid crystal drive voltage from lowering due to a threshold voltage $V_{th}$ of a transistor that configures a video signal writing circuit, and an electronic apparatus including the liquid crystal display device.

Solutions to Problems

A liquid crystal display device of the present disclosure for achieving the object described above includes:
a liquid crystal unit including a pixel electrode, a counter electrode facing the pixel electrode, and a liquid crystal layer sealed between the pixel electrode and the counter electrode;
a first writing circuit configured to write a positive polarity video signal among video signals whose polarity changes periodically; and
a second writing circuit configured to write a negative polarity video signal among the video signals whose polarity changes periodically,
the liquid crystal unit, the first writing circuit, and the second writing circuit provided for each pixel, and
the first writing circuit and the second writing circuit including transistors having conductivity types different from each other. Furthermore, an electronic apparatus of the present disclosure for achieving the object described above includes the liquid crystal display device having the above configuration.

MODE FOR CARRYING OUT THE INVENTION

Figure 1:
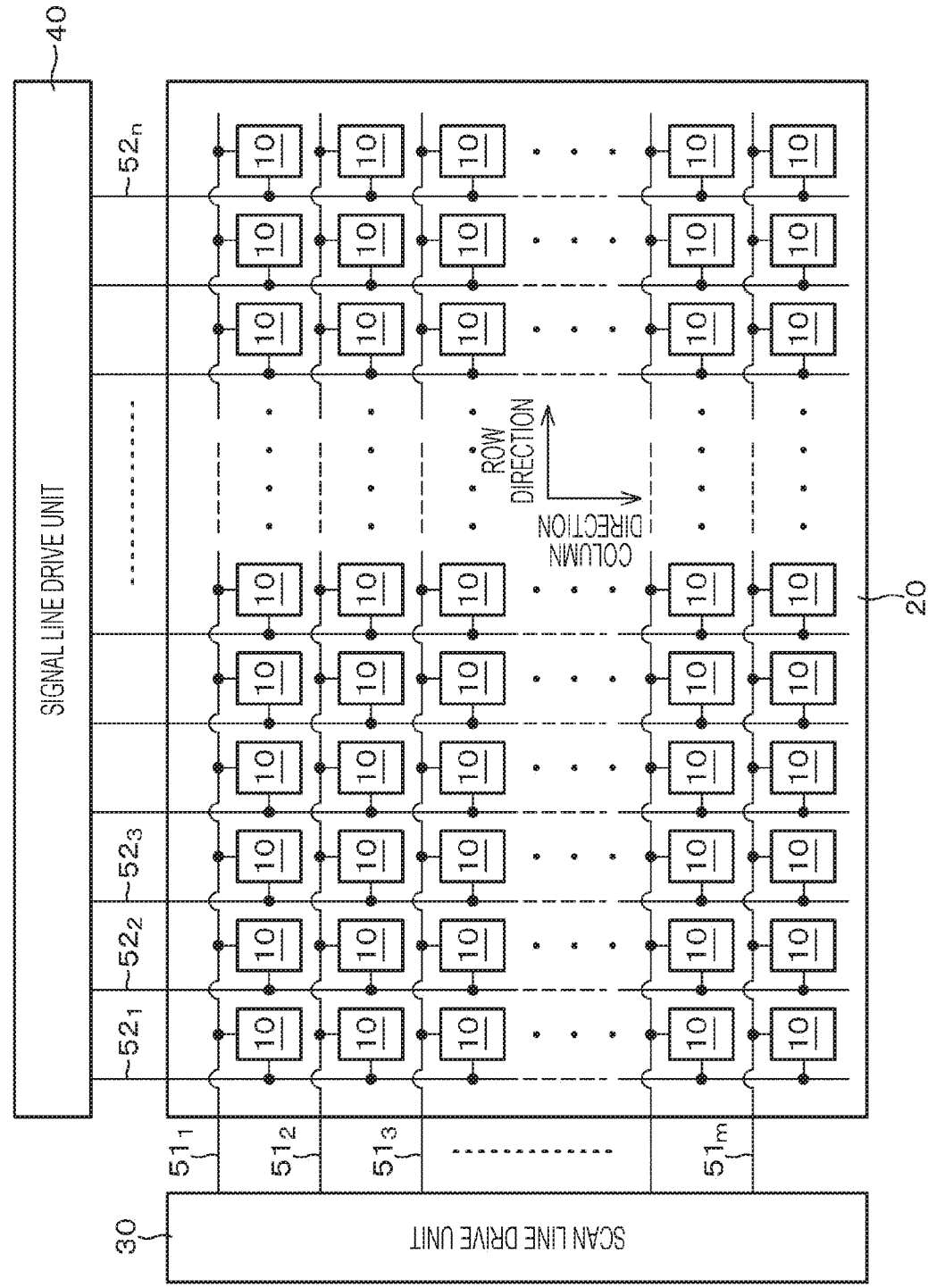
FIG. 1 is a system configuration diagram illustrating an example of the system configuration of a liquid crystal display device of the present disclosure.

Hereinafter, a mode for carrying out the technology of the present disclosure (hereinafter, referred to as an embodiment) will be described in detail with reference to the drawings. The technology of the present disclosure is not limited to the embodiment, and various numerical values, materials, and the like in the embodiment are examples. In the following description, the same elements or elements having the same function will be denoted by the same reference signs, and an overlapping description will be omitted. Note that the description will be given in the following order.

1. General description of liquid crystal display device and electronic apparatus of present disclosure
2. Liquid crystal display device to which technology of present disclosure is applied
3. Basic configuration of liquid crystal display device
3-1. System configuration
3-1-1. $V_{com}$ inversion driving
3-1-2. Surface collective driving
3-2. Pixel circuit according to reference example
4. Liquid crystal display device according to embodiment
4-1. Example 1 (Example of case where liquid crystal mode is VA mode)
4-2. Example 2 (Example of case where liquid crystal mode is TN mode)
4-3. Example 3 (Modification of Example 1: Example using transfer gate)
4-4. Example 4 (Example of LCOS device)
5. Electronic apparatus of present disclosure
5-1. Specific example 1 (Example of projection-type display device)
5-2. Specific example 2 (Example of head mounted display)
6. Configurations that present disclosure can take <General Description of Liquid Crystal Display Device and Electronic Apparatus of Present Disclosure>

A liquid crystal display device and an electronic apparatus of the present disclosure may have a configuration in which a common voltage whose polarity is periodically inverted in synchronization with a positive polarity video signal and a negative polarity video signal is be applied to a counter electrode of a liquid crystal unit in common for all the pixels.

The liquid crystal display device and the electronic apparatus of the present disclosure including the preferred configuration as described above may have a configuration in which a first writing circuit and a second writing circuit have storage capacitors that hold a positive polarity video signal and a negative polarity video signal, respectively. Moreover, the first writing circuit and the second writing circuit may include first transfer transistors that alternately write a positive polarity video signal and a negative polarity video signal to the storage capacitors, and second transfer transistors that alternately apply held voltages of the storage capacitors to the pixel electrode of the liquid crystal unit collectively for all the pixels.

Moreover, the liquid crystal display device and the electronic apparatus of the present disclosure including the preferred configuration as described above may have a configuration in which in a case where a liquid crystal mode is a VA mode, each of the first transfer transistor and the second transfer transistor of the first writing circuit includes an N-channel transistor and each of the first transfer transistor and the second transfer transistor of the second writing circuit includes a P-channel transistor. Alternatively, a configuration may be adopted in which in a case where a liquid crystal mode is a TN mode, each of the first transfer transistor and the second transfer transistor of the first writing circuit includes a P-channel transistor and each of the first transfer transistor and the second transfer transistor of the second writing circuit includes an N-channel transistor.

Furthermore, the liquid crystal display device and the electronic apparatus of the present disclosure including the above-described preferred configuration may have a configuration in which a threshold voltage of the first transfer transistor of each of the first writing circuit and the second writing circuit is equal to or lower than a threshold voltage of a voltage-reflectance/transmittance characteristic of liquid crystal. Furthermore, the first transfer transistor of each of the first writing circuit and the second writing circuit may include a transfer gate in which an N-channel transistor and P-channel type transistor are connected in parallel.

In addition, the liquid crystal display device and the electronic apparatus of the present disclosure including the above-described preferred configuration may have a configuration in which the liquid crystal unit, the first writing circuit, and the second writing circuit are formed on a semiconductor substrate.

<Liquid Crystal Display Device to which Technology of Present Disclosure is Applied>

First, a liquid crystal display device to which the technology of the present disclosure is applied will be described.

The liquid crystal display devices are classified into a transmissive type, a reflective type, and a semi-transmissive type with respect to a display system. In addition, as examples of a material used for a thin film transistor (TFT) used for a pixel, silicon, a transparent oxide semiconductor (TOS), an organic semiconductor, and the like can be mentioned.

Furthermore, in a transmissive-type liquid crystal display device, amorphous silicon (noncrystalline semiconductor) or poly-silicon (polycrystalline semiconductor) is often used as a silicon material. In a reflective-type liquid crystal display device, single crystal silicon is often used. Note that poly-silicon is classified into high temperature poly-silicon (HTPS) that forms a thin film in a high-temperature environment of 1000 degrees Celsius or higher, and low temperature poly-silicon (LTPS) that forms a thin film in a low-temperature environment of 600 degrees Celsius or lower.

In a liquid crystal panel, a transparent substrate having a light-transmissive property such as a quartz substrate, a glass substrate, or a silicon substrate is used as a substrate on which liquid crystal is disposed. In general, a glass substrate is used in an amorphous silicon-transmissive type liquid crystal panel or a low temperature poly-silicon-transmissive type liquid crystal panel, a quartz substrate is used in a high temperature poly-silicon-transmissive type liquid crystal panel, and a silicon substrate is used in a single crystal silicon-reflective type liquid crystal panel. A device in which liquid crystal is disposed on a silicon substrate is generally called liquid crystal on silicon (LCOS).

A liquid crystal mode (liquid crystal molecule arrangement) includes a vertical alignment (VA) mode and a twisted nematic (TN) mode. The VA mode is normally black in which transmittance or reflectance is minimized and the screen becomes black when no voltage is applied to the liquid crystal. The TN mode is normally white in which the transmittance or the reflectance is maximized and the screen becomes white when no voltage is applied to the liquid crystal.

Furthermore, a TFT process includes high temperature poly-silicon, low temperature poly-silicon, and amorphous silicon (a-Si). In a liquid crystal panel for a projection-type display device (projector), the VA mode is often selected as the liquid crystal mode, and high temperature poly-silicon (HTPS) is often selected as the TFT process (so-called HTPS-liquid crystal panel). In small and medium-sized direct-view liquid crystal panels, the VA mode is often selected as the liquid crystal mode, and low temperature poly-silicon (LTPS) is often selected as the TFT process (so-called LTPS-liquid crystal panel). In large-sized direct-view liquid crystal panels, the VA mode is often selected as the liquid crystal mode, and amorphous silicon is often selected as the TFT process (so-called aSi-liquid crystal panel).

The technology of the present disclosure described below can be applied to any display system of the transmissive type, the reflective type, and the semi-transmissive type, and can be applied to a case where the liquid crystal mode is any of the VA mode and the TN mode. Moreover, the technology of the present disclosure can also be applied to a case where the material of the thin film transistor is any of silicon, transparent oxide semiconductor, and organic semiconductor.

<Basic Configuration of Liquid Crystal Display Device>

The basic configuration of the liquid crystal display device of the present disclosure will be described by taking an active matrix liquid crystal display device as an example. The active matrix liquid crystal display device is a display device of a so-called active matrix drive system in which an independent pixel electrode is disposed in each pixel and a switching element is connected to each pixel electrode to selectively drive the pixels.

In the active matrix liquid crystal display device, a liquid crystal panel is configured by enclosing liquid crystal between two substrates, that is, a first substrate and a second substrate. The first substrate is, for example, a thin film transistor (TFT) substrate on which a TFT is formed as a switching element. The second substrate is a counter substrate on which a color filter, a counter electrode, and the like are formed and which faces the TFT substrate. Then, in the liquid crystal panel, liquid crystal alignment is controlled by switching control performed by the switching element and voltage application based on a video signal, and video display is performed by changing light transmittance/reflectance.

[System Configuration]

FIG. 1 illustrates an example of the system configuration of the active matrix liquid crystal display device. As illustrated in FIG. 1, the active matrix liquid crystal display device according to the present example includes a pixel array section 20 in which pixels 10 are two-dimensionally arranged in a row direction and a column direction, and a pixel drive unit that drives each pixel 10 of the pixel array section 20. The pixel drive unit includes a scan line drive unit 30, a signal line drive unit 40, and the like.

The pixel array section 20 has a pixel array of m rows and n columns. For this pixel arrangement of m rows and n columns, scan lines $51_1$ to $51_m$ (hereinafter sometimes collectively referred to as a "scan line 51") are wired for each pixel row, and signal lines $52_1$ to $52_n$ (hereinafter, sometimes collectively referred to as a "signal line 52") are wired for each pixel column. One end of the scan line 51 is connected to an output end in the corresponding row of the scan line drive unit 30. One end of the signal line 52 is connected to an output end in the corresponding column of the signal line drive unit 40.

($V_{com}$ Inversion Driving)

In the active matrix liquid crystal display device having the configuration described above, so-called AC driving is performed in which the voltage applied to the liquid crystal is inverted with the reference voltage as a center at a constant cycle by using an AC driven analog video signal. Here, the "AC driven analog video signal" refers to an analog video signal whose polarity is inverted at a predetermined cycle centered on a reference voltage $V_{com}$ (hereinafter, referred to as a "common voltage $V_{com}$"). The common voltage $V_{com}$ is applied to the counter electrode (common electrode) of the liquid crystal unit.

In the case of AC driving, an AC driven analog video signal, that is, a positive polarity video signal and a negative polarity video signal are alternately supplied from the signal line drive unit 40 to the signal lines $52_1$ to $52_n$. Furthermore, in the active matrix liquid crystal display device according to this example, so-called $V_{com}$ inversion driving is adopted in which the polarity of the common voltage $V_{com}$ applied to the counter electrode of the liquid crystal unit is periodically inverted in synchronization with the positive polarity video signal and the negative polarity video signal.

(Surface Collective Driving)

In the $V_{com}$ inversion driving liquid crystal display device, as a drive system of each pixel 10 of the pixel array section 20, surface collective driving is known in which all the pixels 10 of the pixel array section 20 are driven simultaneously (collectively) with respect to the entire screen. According to this surface collective driving, it is possible to suppress image interference due to line-sequential driving in which driving is performed sequentially in units of rows from the upper part to the lower part of the screen.

In order to realize surface collective driving, a configuration is adopted in which two storage capacitors are provided in the pixel circuit, and a positive polarity video signal and a negative polarity video signals are separately held in the storage capacitors of the two systems, and held voltages of the storage capacitors are alternately applied to the pixel electrodes of the liquid crystal unit. Therefore, since the voltages applied to the pixel electrode can be held in the storage capacitors of the respective two systems for one display frame period, the AC drive frequency in the $V_{com}$ inversion driving can be set to any value independently of the vertical scanning frequency.

As an example, considering a liquid crystal display device driven at 60 Hz, the driving speed is 120 Hz in the case of double speed driving. However, in the case of 60 Hz driving, if surface collective driving is performed for each color of red R, green G, and blue B, it is necessary to output video signals of respective RGB colors in the period of one cycle of 60 Hz. Therefore, for example, driving at 180 Hz (=60 Hz×3 (for 3 RGB colors)) is performed. As described above, by adopting the surface collective driving using the two-system storage capacitors, the AC drive frequency in $V_{com}$ inversion driving can be set to any frequency regardless of the vertical scanning frequency.

[Pixel Circuit According to Reference Example]

Figure 2:
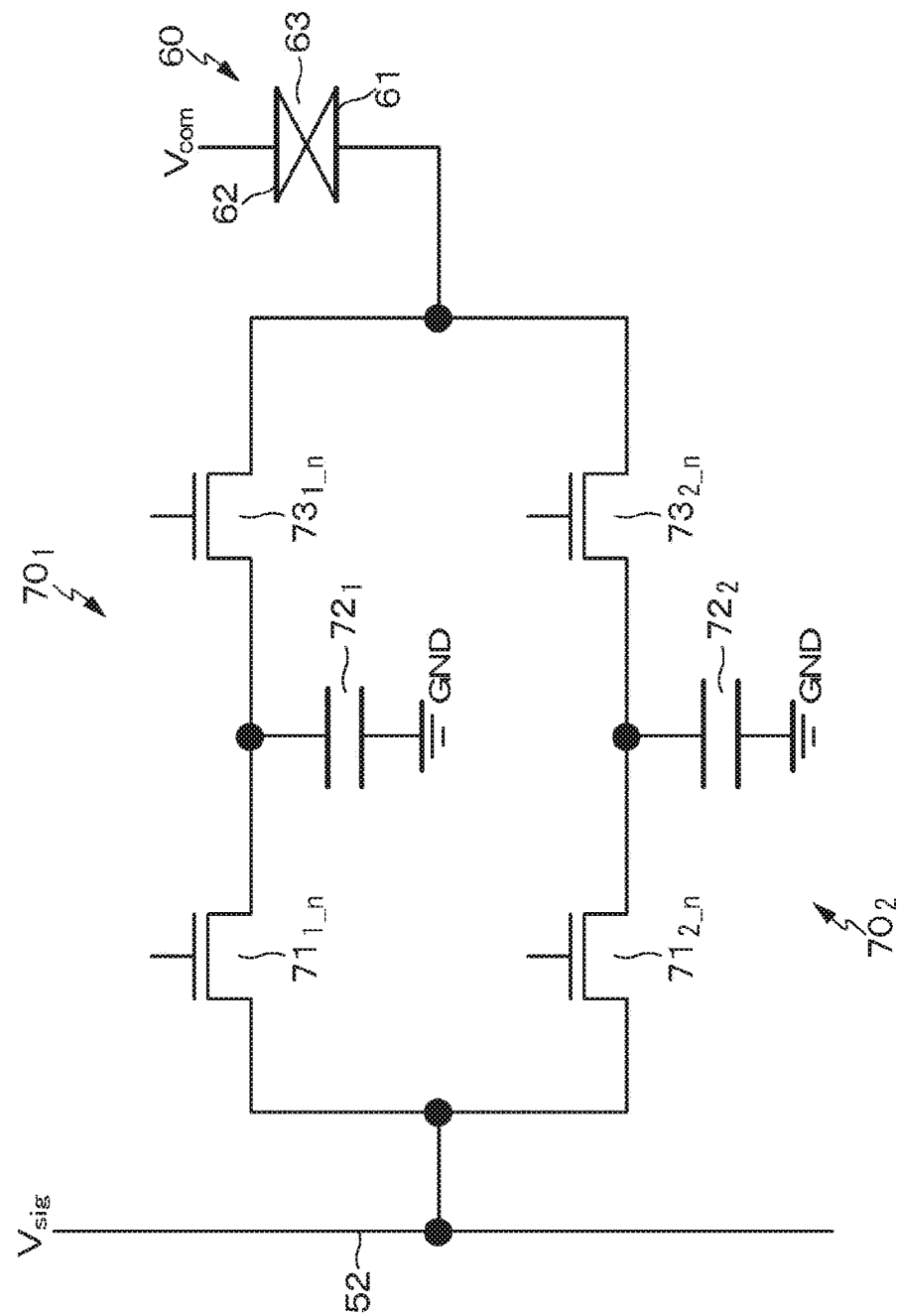
FIG. 2 is a circuit diagram illustrating a circuit example of a pixel circuit according to a reference example.

In the following, a pixel circuit for realizing surface collective driving in a $V_{com}$ inversion driving liquid crystal display device will be described. FIG. 2 illustrates a circuit example of a pixel circuit according to a reference example, which is a premise of the technology of the present disclosure. FIG. 2 illustrates a pixel circuit for one pixel. Here, a case where the liquid crystal mode (liquid crystal molecule arrangement) is a normally black VA mode will be described as an example.

A liquid crystal unit (liquid crystal element) 60 includes a pixel electrode 61, a counter electrode (common electrode) 62 facing the pixel electrode 61, and a liquid crystal layer 63 sealed between the pixel electrode 61 and the counter electrode 62. A common voltage $V_{com}$ whose polarity is periodically inverted in synchronization with polarity inversion of a video signal $V_{sig}$ is applied to the counter electrode 62 in common for all the pixels.

The video signal $V_{sig}$ whose polarity is periodically inverted is supplied to the pixel (pixel circuit) through a signal line 52. A drive circuit that drives the liquid crystal unit 60 includes a first writing circuit $70_1$ that writes a positive (so-called a positive (P) phase) video signal and a second writing circuit $70_2$ that writes a negative (so-called a negative (N) phase) video signal.

The first writing circuit $70_1$ includes a first transfer transistor $71_{1\_n}$, a storage capacitor $72_1$, and a second transfer transistor $73_{1\_n}$. Each of the first transfer transistor $71_{1\_n}$ and the second transfer transistor $73_{1\_n}$ is an N-channel MOS transistor. One of the source and drain electrodes of the first transfer transistor $71_{1\_n}$ is connected to the signal line 52. One end of the storage capacitor $72_1$ and one of the source and drain electrodes of the second transfer transistor $73_{1\_n}$ are connected to the other of the source and drain electrodes of the first transfer transistor $71_{1\_n}$. The other end of the storage capacitor $72_1$ is connected to a ground GND which is a node of a reference potential. The other of the source and drain electrodes of the second transfer transistor $73_{1\_n}$ is connected to the pixel electrode 61 of the liquid crystal unit 60.

Basically, the second writing circuit $70_2$ also has a similar circuit configuration as that of the first writing circuit $70_1$. That is, the second writing circuit $70_2$ includes a first transfer transistor $71_{2\_n}$, a storage capacitor $72_2$, and a second transfer transistor $73_{2\_n}$. Each of the first transfer transistor $71_{2\_n}$ and the second transfer transistor $73_{2\_n}$ is an N-channel MOS transistor. One of the source and drain electrodes of the first transfer transistor $71_{2\_n}$ is connected to the signal line 52. One end of the storage capacitor $72_2$ and one of source and drain electrodes of the second transfer transistor $73_{2\_n}$ are connected to the other of the source and drain electrodes of the first transfer transistor $71_{2\_n}$. The other end of the storage capacitor $72_2$ is connected to a ground GND. The other of the source and drain electrodes of the second transfer transistor $73_{2\_n}$ is connected to the pixel electrode 61 of the liquid crystal unit 60.

As described above, the pixel circuit according to the reference example has a configuration in which all the first writing circuit $70_1$ that writes a positive (P phase) video signal and the second writing circuit $70_2$ that writes a negative (N phase) video signal are N-channel MOS transistors. In the case of considering a pixel circuit of surface collective driving, it is fundamental to configure the circuit only with N-channel MOS transistors having high driving ability and high area efficiency.

However, in the case of configuring the circuit only with N channel type MOS transistors, since not only coupling with the storage capacitors $72_1$, $72_2$ but also voltage drop due to the threshold voltage $V_{th}$ of the N-channel MOS transistors have an influence, the writing voltage to the pixel is lowered. This lowering of the write voltage leads to lowering of a liquid crystal drive voltage on the negative polarity side (N phase). As a result, the reflectance is lowered and the voltage waveforms of the N-phase and P-phase liquid crystal drive voltages are unbalanced.

Figure 3A:
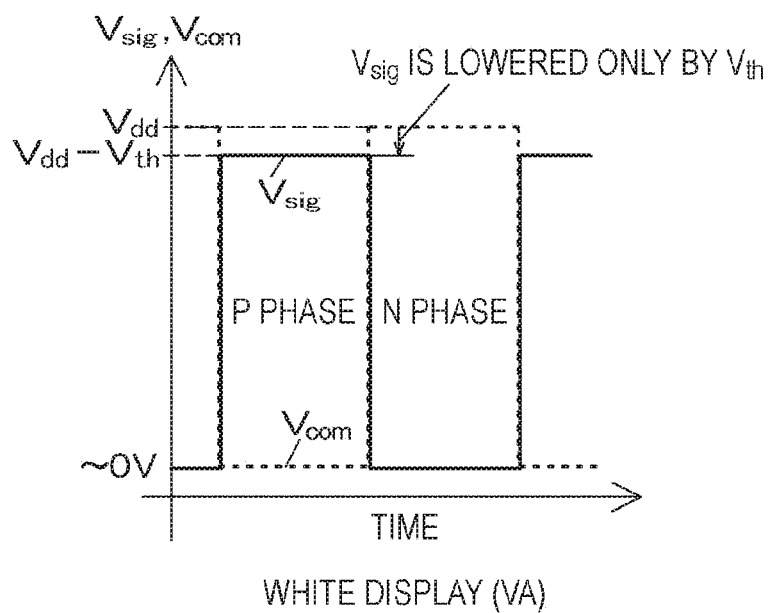
FIG. 3A is a waveform diagram illustrating voltage waveforms of a video signal $V_{sig}$ and a common voltage $V_{com}$ during white display.
Figure 3B:
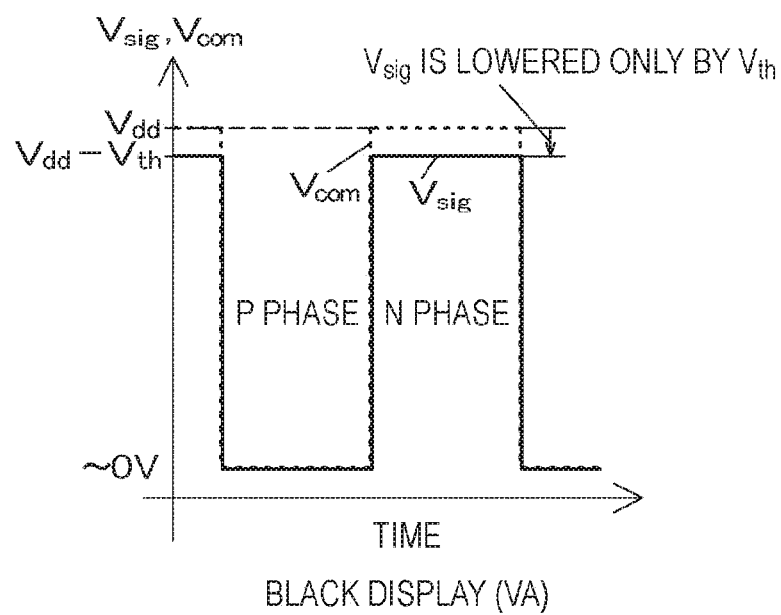
FIG. 3B is a waveform diagram illustrating voltage waveforms of a video signal $V_{sig}$ and a common voltage $V_{com}$ during black display, in a pixel circuit according to a reference example.

FIG. 3A illustrates voltage waveforms of a video signal $V_{sig}$ and a common voltage $V_{com}$ during white display and FIG. 3B illustrates voltage waveforms of a video signal $V_{sig}$ and a common voltage $V_{com}$ during black display, in a pixel circuit according to the reference example.

Note that here, the case where the liquid crystal mode is the normally black VA mode has been described as an example; however, in a case where the liquid crystal mode is the normally white TN mode, the transmittance is lowered due to lowering of the liquid crystal drive voltage.

<Liquid Crystal Display Device According to Embodiment>

In the liquid crystal display device according to the embodiment of the present disclosure, in order to eliminate the above-described adverse effect caused by using only N-channel MOS transistors as the transistors forming the first writing circuit $70_1$ and the second writing circuit $70_2$, the following configuration is adopted. That is, since a first writing circuit $70_1$ and a second writing circuit $70_2$ are configured by using transistors having conductivity types different from each other, the writing voltage to a pixel is prevented from lowering due to a threshold voltage $V_{th}$ of the transistors included in the first writing circuit $70_1$ and the second writing circuit $70_2$.

Hereinafter, a specific example of the present embodiment for preventing the writing voltage to the pixel from lowering due to the threshold voltage $V_{th}$ of the transistors included in the first writing circuit $70_1$ and the second writing circuit $70_2$ will be described.

Example 1

Figure 4:
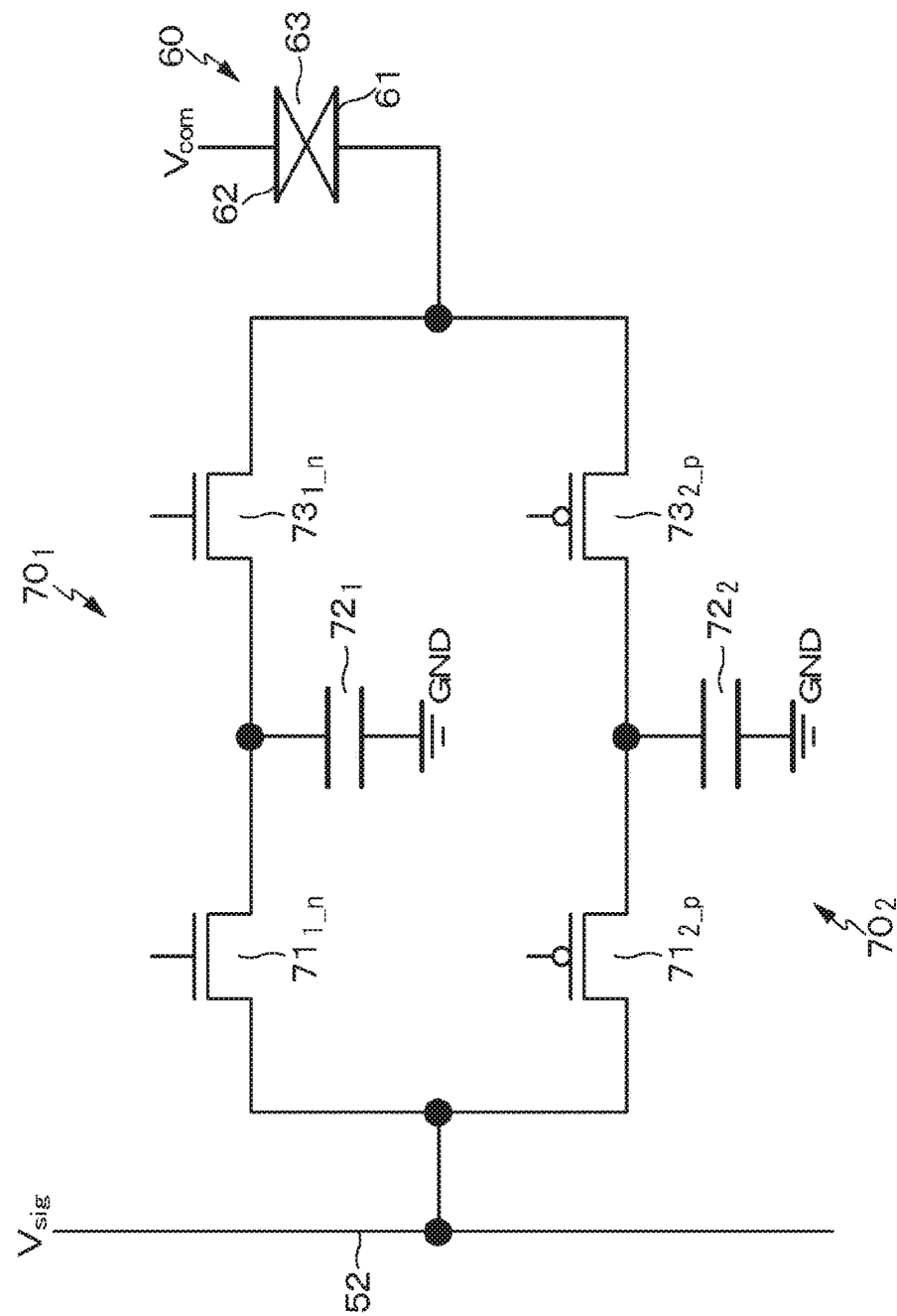
FIG. 4 is a circuit diagram illustrating a circuit example of a pixel circuit according to Example 1.

Example 1 is an example in which the liquid crystal mode is the VA mode. A circuit example of the pixel circuit according to Example 1 is illustrated in FIG. 4. FIG. 4 illustrates a pixel circuit for one pixel.

A liquid crystal unit (liquid crystal element) 60 includes a pixel electrode 61, a counter electrode (common electrode) 62 facing the pixel electrode 61, and a liquid crystal layer 63 sealed between the pixel electrode 61 and the counter electrode 62. A common voltage $V_{com}$ whose polarity is periodically inverted in synchronization with polarity inversion of a video signal $V_{sig}$ is applied to the counter electrode 62 in common for all the pixels.

The first writing circuit $70_1$ includes a first transfer transistor $71_{1\_n}$, a storage capacitor $72_1$, and a second transfer transistor $73_{1\_n}$. Each of the first transfer transistor $71_{1\_n}$ and the second transfer transistor $73_{1\_n}$ is an N-channel MOS transistor. One of the source and drain electrodes of the first transfer transistor $71_{1\_n}$ is connected to the signal line 52. One end of the storage capacitor $72_1$ and one of the source and drain electrodes of the second transfer transistor $73_{1\_n}$ are connected to the other of the source and drain electrodes of the first transfer transistor $71_{1\_n}$. The other end of the storage capacitor $72_1$ is connected to a ground GND which is a reference potential. The other of the source and drain electrodes of the second transfer transistor $73_{1\_n}$ is connected to the pixel electrode 61 of the liquid crystal unit 60.

The second writing circuit $70_2$ includes a first transfer transistor $71_{2\_p}$, a storage capacitor $72_2$, and a second transfer transistor $73_{2\_p}$. The first transfer transistor $71_{2\_p}$, and the second transfer transistor $73_{2\_p}$ are P-channel MOS transistors. One of the source and drain electrodes of the first transfer transistor $71_{2\_p}$, is connected to the signal line 52. One end of the storage capacitor $72_2$ and one of source and drain electrodes of the second transfer transistor $73_{2\_p}$ are connected to the other of the source and drain electrodes of the first transfer transistor $71_{2\_p}$. The other end of the storage capacitor $72_2$ is connected to a ground GND. The other of the source and drain electrodes of the second transfer transistor $73_{2\_p}$ is connected to the pixel electrode 61 of the liquid crystal unit 60.

As described above, the pixel circuit according to Example 1 has a configuration in which in the case of the VA mode, N-channel MOS transistors are used as the transistors configuring the first writing circuit $70_1$ that writes a P-phase video signal, and P-channel MOS transistors are used as the transistors configuring the second writing circuit $70_2$ that writes an N-phase video signal.

Figure 5A:
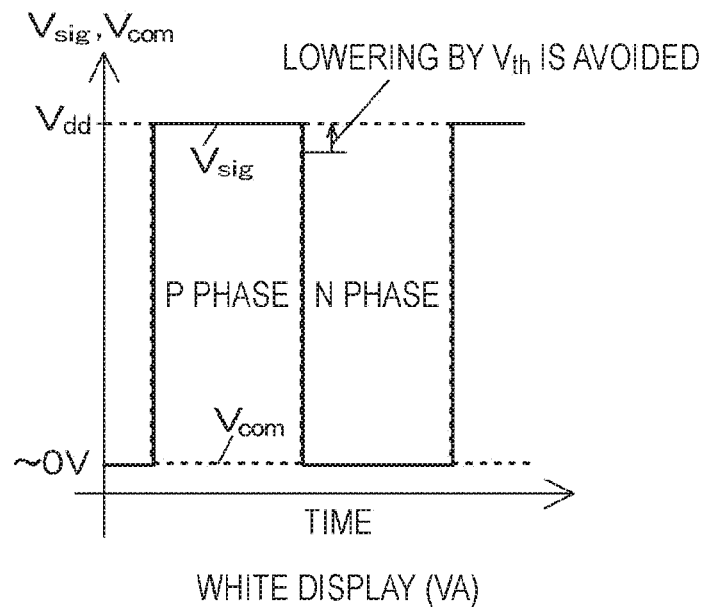
FIG. 5A is a waveform diagram illustrating voltage waveforms of a video signal $V_{sig}$ and a common voltage $V_{com}$ during white display.
Figure 5B:
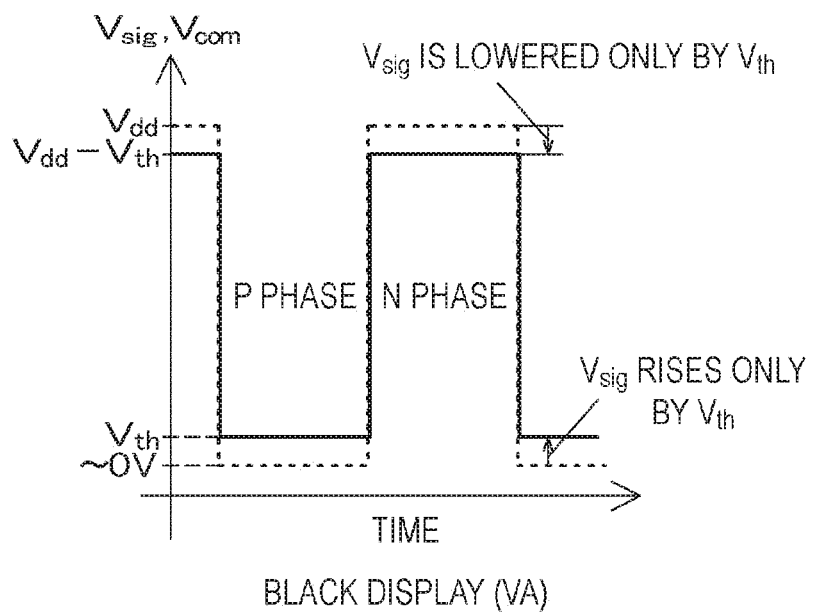
FIG. 5B is a waveform diagram illustrating voltage waveforms of a video signal $V_{sig}$ and a common voltage $V_{com}$ during black display, in a pixel circuit according to Example 1.

FIG. 5A illustrates voltage waveforms of a video signal $V_{sig}$ and a common voltage $V_{com}$ during white display and FIG. 5B illustrates voltage waveforms of a video signal $V_{sig}$ and a common voltage $V_{com}$ during black display, in the pixel circuit according to Example 1.

In the case of the VA mode, since P-channel MOS transistors are used to configure the second writing circuit $70_2$ that writes an N-phase video signal, it is possible to prevent a writing voltage to the pixel in the N-phase from lowering at the time of writing the video signal. Therefore, a liquid crystal drive voltage is prevented from lowering. Therefore, in the pixel circuit of surface collective driving, it is possible to apply the maximum voltage as the liquid crystal drive voltage with a small number of transistors, that is, two first writing circuit $70_1$ and two second writing circuits $70_2$, in a total of four transistors, without being affected by the threshold voltage $V_{th}$ of the transistor. Moreover, since it is possible to prevent the liquid crystal drive voltage from decreasing in the N phase, it is possible to maintain the balance of the voltage waveforms of the N-phase and P-phase liquid crystal drive voltages, and thus it is possible to obtain a good display image.

Figure 6:
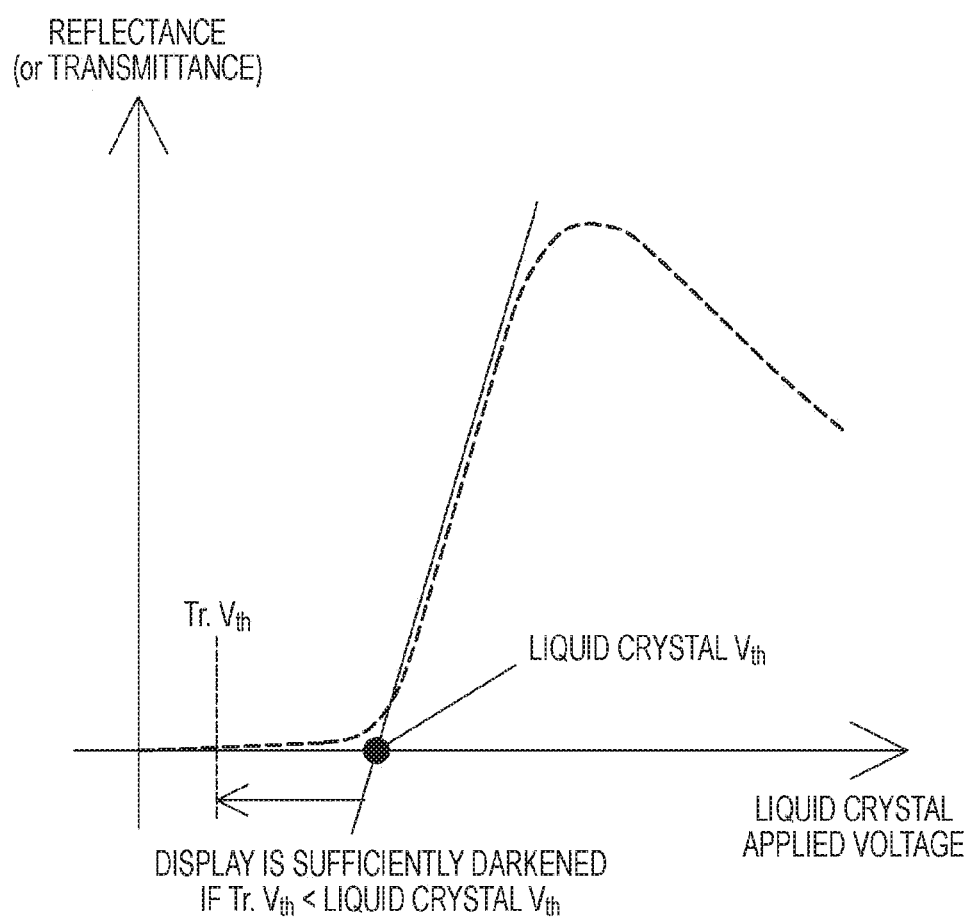
FIG. 6 is a characteristic diagram illustrating a voltage-reflectance/transmittance characteristic of liquid crystal.

FIG. 6 illustrates a voltage-reflectance/transmittance characteristic of liquid crystal. As is clear from FIG. 6, the voltage-reflectance/transmittance characteristic of liquid crystal also has a threshold voltage. Therefore, in the pixel circuit according to Example 1, it is preferable to set the threshold voltage $V_{th}$ of the first transfer transistors $71_{1\_n}$, $71_{2\_p}$ of the first writing circuit $70_1$ and the second writing circuit $70_2$ to be equal to or less than the threshold voltage of the voltage-reflectance/transmittance characteristic of liquid crystal.

Incidentally, on the side where the reflectance is low, both the N phase and the P phase are affected by the threshold voltage $V_{th}$ of the first transfer transistors $71_{1\_n}$, $71_{2\_p}$, and the video signal $V_{sig}$ rises by the threshold voltage $V_{th}$. In contrast, in the pixel circuit according to the first embodiment, as described above, the threshold voltage $V_{th}$ of the first transfer transistors $71_{1\_n}$, $71_{2\_p}$ is set to be equal to or lower than the threshold voltage of the voltage-reflectance/transmittance characteristic of the liquid crystal. As a result, even if the video signal $V_{sig}$ rises by the threshold voltage $V_{th}$, the liquid crystal does not move. Therefore, display is darkened on the side where the reflectance is low, that is, the black display becomes a darker black display.

Example 2

Figure 7:
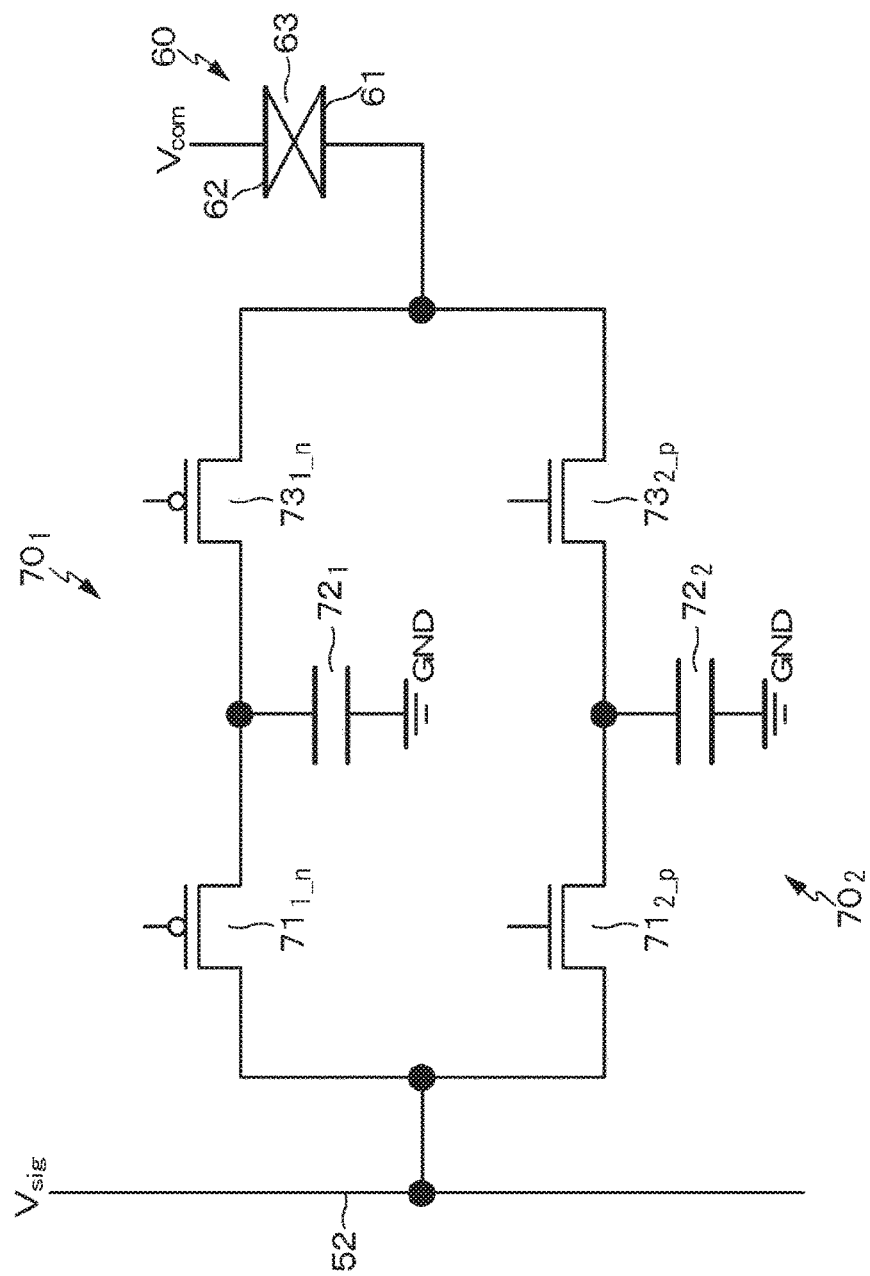
FIG. 7 is a circuit diagram illustrating a circuit example of a pixel circuit according to Example 2.

Example 2 is an example in which the liquid crystal mode is the TN mode. A circuit example of the pixel circuit according to Example 2 is illustrated in FIG. 7. FIG. 7 illustrates a pixel circuit for one pixel.

In the first writing circuit $70_1$, the first transfer transistor $71_{1\_n}$ and the second transfer transistor $73_{1\_n}$ are P-channel MOS transistors. One of the source and drain electrodes of the first transfer transistor $71_{1\_n}$ is connected to the signal line 52. One end of the storage capacitor $72_1$ and one of the source and drain electrodes of the second transfer transistor $73_{1\_n}$ are connected to the other of the source and drain electrodes of the first transfer transistor $71_{1\_n}$. The other end of the storage capacitor $72_1$ is connected to a ground GND which is a reference potential. The other of the source and drain electrodes of the second transfer transistor $73_{1\_n}$ is connected to the pixel electrode 61 of the liquid crystal unit 60.

In the second writing circuit $70_2$, the first transfer transistor $71_{2\_n}$ and the second transfer transistor $73_{2\_n}$ are N-channel MOS transistors. One of the source and drain electrodes of the first transfer transistor $71_{2\_n}$ is connected to the signal line 52. One end of the storage capacitor $72_2$ and one of source and drain electrodes of the second transfer transistor $73_{2\_n}$ are connected to the other of the source and drain electrodes of the first transfer transistor $71_{2\_n}$. The other end of the storage capacitor $72_2$ is connected to a ground GND. The other of the source and drain electrodes of the second transfer transistor $73_{2\_n}$ is connected to the pixel electrode 61 of the liquid crystal unit 60.

Also in the pixel circuit according to Example 2 having the configuration described above, the operation and effect similar to those in the pixel circuit according to Example 1 can be obtained. That is, in the case of the TN mode, since the P-channel MOS transistor is used to configure the first writing circuit $70_1$ that writes a P-phase video signal, it is possible to prevent the liquid crystal drive voltage from lowering. Therefore, since the maximum voltage can be applied as the liquid crystal drive voltage without being affected by the threshold voltage $V_{th}$ of the transistors, and the balance of the voltage waveforms of the N-phase and P-phase liquid crystal drive voltages can be maintained, a good display image can be obtained.

Example 3

Figure 8:
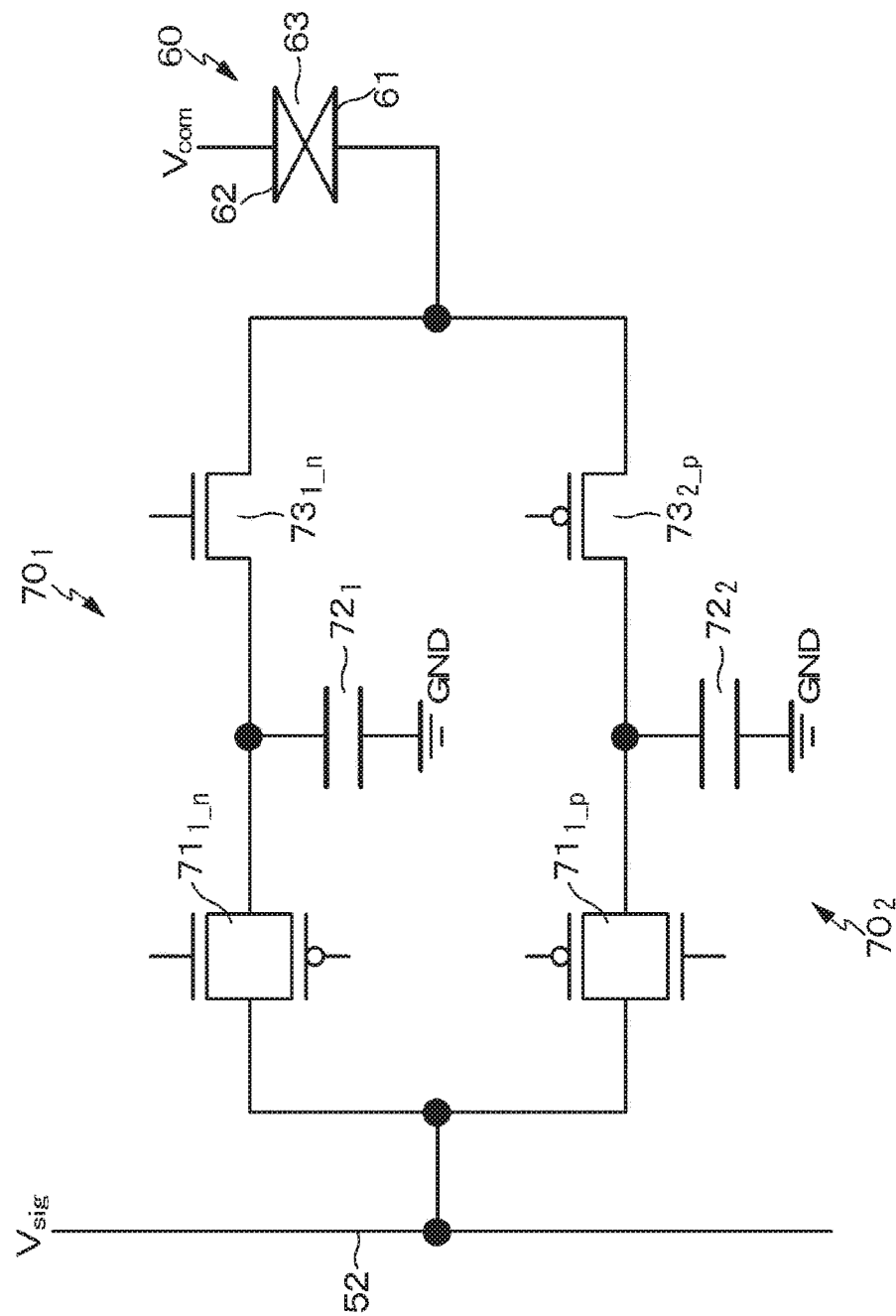
FIG. 8 is a circuit diagram illustrating a circuit example of a pixel circuit according to Example 3.

Example 3 is a modification of Example 1 and is an example in which a transfer gate is used as the first transfer transistor. A circuit example of the pixel circuit according to Example 3 is illustrated in FIG. 8. FIG. 8 illustrates a pixel circuit for one pixel.

In the pixel circuit according to Example 3, the first writing circuit $70_1$ and the second writing circuit $70_2$ are configured such that each of the first transfer transistors $71_{1\_n}$, $71_{2\_n}$ is a transfer gate in which an N-channel transistor and a P-channel transistor are connected in parallel. According to the pixel circuit of Example 3, although the number of transistors is increased as compared with that in the Example 1 in which each of the first transfer transistors $71_{1\_n}$, $71_{2\_n}$ includes a single transistor, there is an advantage that the driving capability can be increased.

Here, Example 3 has been described as a modification of Example 1 in the VA mode. Similarly, as a modification of Example 2 of the TN mode, a configuration may be adopted where the first transfer transistors $71_{1\_n}$, $71_{2\_n}$ of the first writing circuit $70_1$ and the second writing circuit $70_2$ are transfer gates. Furthermore, the first transfer transistor $71_{2\_n}$ and the second transfer transistor $73_{2\_n}$ in the P-phase second writing circuit $70_2$ can also include transfer gates.

Example 4

Example 4 is an example of an LCOS device in which liquid crystal is disposed on a semiconductor substrate. The LCOS device is a device in which a liquid crystal layer is sandwiched between a silicon substrate and a transparent substrate.

Figure 9:
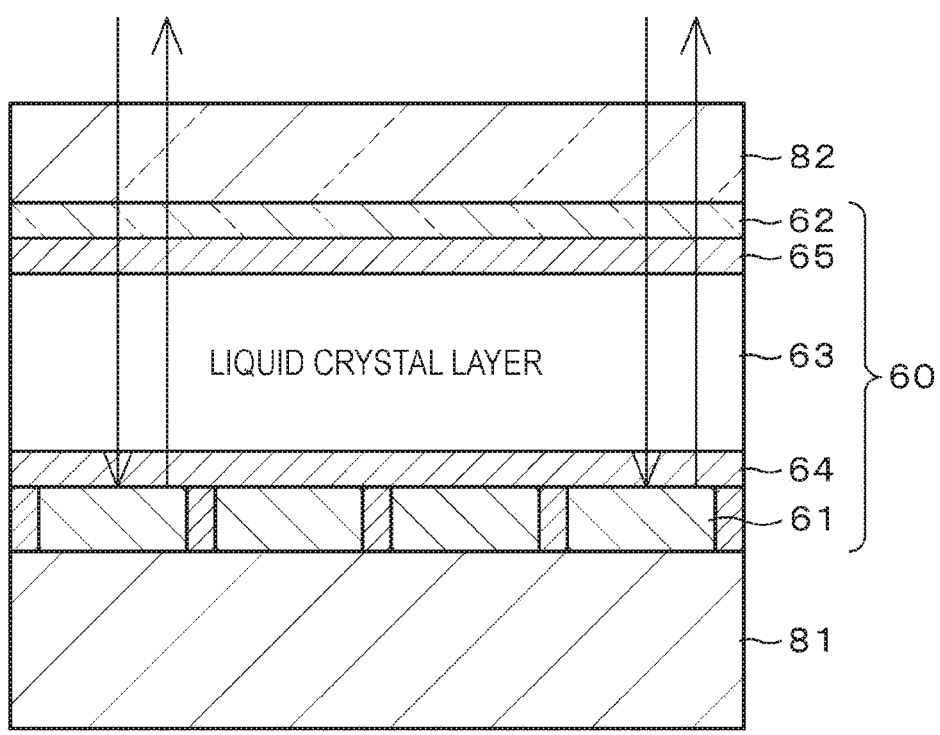
FIG. 9 is a sectional view illustrating an example of a sectional structure of a LCOS device according to Example 4.

FIG. 9 illustrates an example of a sectional structure of the LCOS device according to Example 4. The LCOS device has a structure in which a liquid crystal drive circuit unit 70 and a pixel electrode 61 are formed on a silicon substrate 81, and a liquid crystal layer 63 is sandwiched by a transparent substrate 82 such as a glass substrate having a counter electrode 62 on an inner surface thereof. The pixel electrode 61 is a reflective electrode including aluminum or the like. The counter electrode 62 is a transparent electrode including indium tin oxide (IOT) or the like. An alignment layer 64 is interposed between the pixel electrode 61 and the liquid crystal layer 63, and an alignment layer 65 is interposed between the liquid crystal layer 63 and the counter electrode 62. Then, light having passed through the counter electrode 62 which is a transparent substrate and the liquid crystal layer 63 is reflected by the pixel electrode 61, which is a reflective electrode.

In the LCOS device, the storage capacitors $72_1$, $72_2$ can have a gate capacitance structure formed between the gate electrodes of the first transfer transistors $71_{1\_n}$, $71_{1\_p}$ or the second transfer transistors $73_{1\_n}$, $73_{1\_p}$ and the silicon substrate, or a metal-insulator-metal (MIM) structure formed on the wiring. In particular, in order to reduce the pixel pitch, it is preferable that each of the storage capacitors $72_1$, $72_2$ has the MIM structure.

<Electronic Apparatus of Present Disclosure>

The liquid crystal display device of the present disclosure described above can be used as a display unit (display device) of an electronic apparatus in any field that displays a video signal input to the electronic apparatus, or a video signal generated in the electronic apparatus, as an image or video. For example, the liquid crystal display device can be used as a display unit of a projection-type display device (projector), a head mounted display, a digital still camera, a video camera, a mobile terminal device such as a mobile phone, a laptop personal computer, a television set, or the like.

The liquid crystal display device of the present disclosure also includes a module-shaped device having a sealed configuration. An example of the module-shaped device is a display module formed by attaching a facing portion such as transparent glass to a pixel array section. Note that the display module may have a configuration in which a circuit unit for inputting and outputting a signal or the like from the outside to the pixel array section, a flexible printed circuit (FPC), or the like is provided.

The liquid crystal display device of the present disclosure, that is, a $V_{com}$ inversion drive liquid crystal display device that realizes surface collective driving by using the storage capacitors of two systems can apply a maximum voltage as a liquid crystal drive voltage and at the same time the balance between voltage waveforms of N-phase and P-phase liquid crystal drive voltages can be maintained. Therefore, a good display image can be obtained by using the liquid crystal display device of the present disclosure as a display unit (liquid crystal panel) of the electronic apparatus.

Hereinafter, a projection-type display device (projector) and a head mounted display will be illustrated as specific examples of the electronic apparatus using the liquid crystal display device of the present disclosure. However, the specific examples illustrated here are examples only, and it is not limited to them.

Specific Example 1

Figure 10:
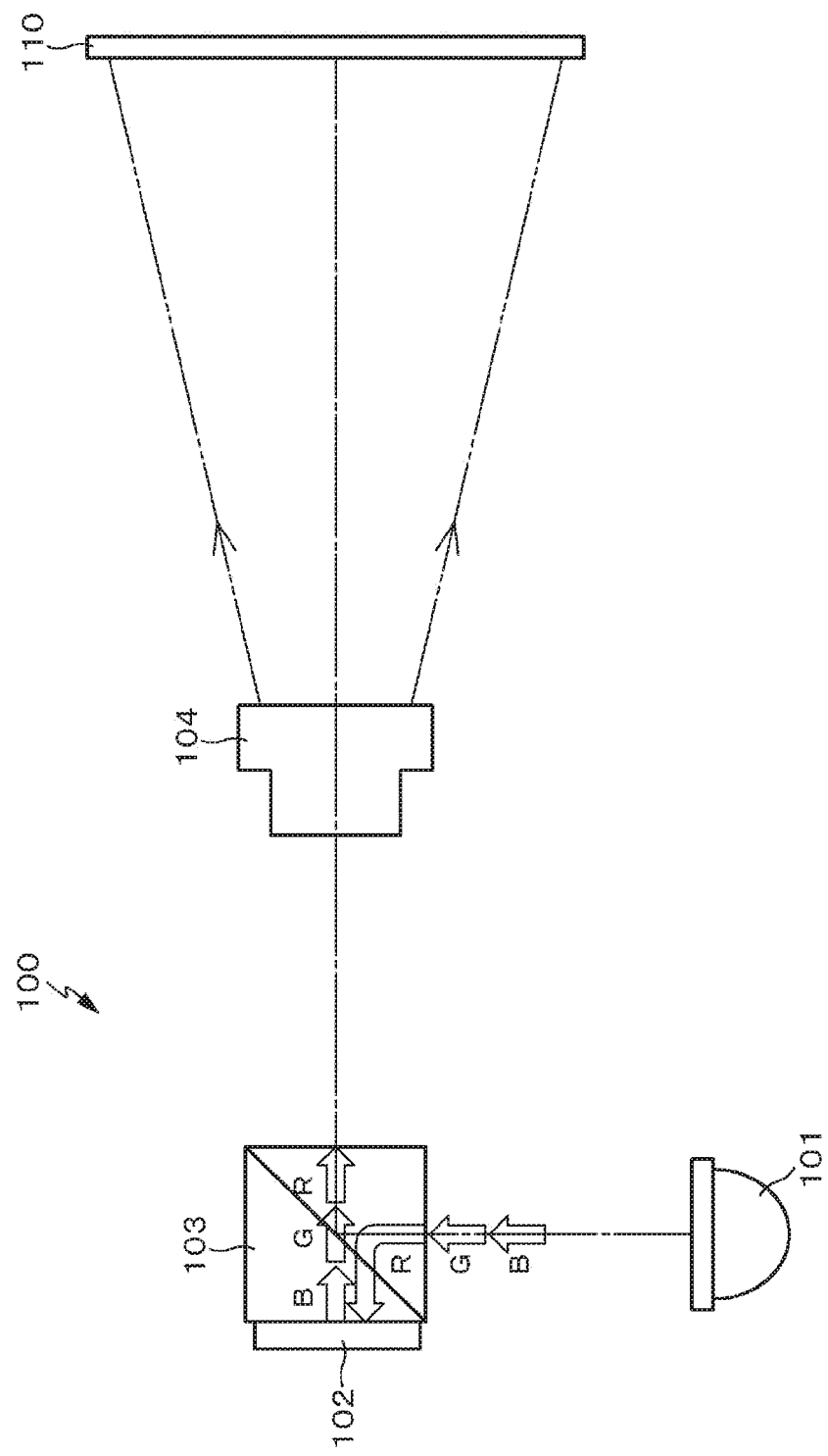
FIG. 10 is a schematic configuration diagram illustrating a basic configuration of a projection-type display device (projector) according to Specific example 1 of an electronic apparatus of the present disclosure.

FIG. 10 is a schematic configuration diagram illustrating a basic configuration of a projection-type display device (projector) according to Specific example 1 of the electronic apparatus of the present disclosure. Here, as the projection-type display device, a single-plate projection-type display device is described as an example.

A single-plate projection-type display device (projector) 100 according to the present Specific example 1 includes a light source 101, a liquid crystal panel (display unit) 102, a beam splitter 103, and a projection lens 104. The light source 101 repeatedly emits light in each color of, for example, R (red), G (green), and B (blue), which is necessary for displaying a color image, in a predetermined cycle. Light in each color emitted from the light source 101 is applied to the liquid crystal panel 102 through the beam splitter 103.

The liquid crystal panel 102 includes, for example, an LCOS device. As the liquid crystal panel 102, it is possible to use the liquid crystal display device according to the present disclosure, that is, a $V_{com}$ inversion drive liquid crystal display device that realizes surface collective driving by using the storage capacitors of two systems. R image light, G image light, and B image light are sequentially emitted from the liquid crystal panel 102 with a time difference, and are guided to the projection lens 104 through the beam splitter 103. The projection lens 104 projects the R image light, the G image light, and the B image light, which are sequentially emitted from the liquid crystal panel 102, toward a screen 110.

As described above, in the single-plate projection-type display device 100 that uses as the liquid crystal panel 102, the $V_{com}$ inversion liquid crystal display device that realizes surface collective driving using the storage capacitors of two systems, the R image light, the G image light, and the B image light emitted sequentially from the liquid crystal panel 102 are projected on the screen 110 with a time difference. Then, the R image, the G image, and the B image projected on the screen 110 with a time difference are synthesized in human eyes and are recognized as a color image.

Note that here, a case where the liquid crystal display device according to the present disclosure is used as the liquid crystal panel in the single-plate projection-type display device has been described as an example. However, the liquid crystal display device according to the present disclosure is applied not only to the single-plate projection-type display device, and the liquid crystal display device according to the present disclosure can be used as a liquid crystal panel in a three-plates projection display device. In a case of being applied to the three-plates projection-type display device, liquid crystal display devices corresponding to R, G, and B colors are used as three liquid crystal panels, and color display is realized by synthesizing images on the three plates. Furthermore, although a reflection type device is used as the liquid crystal panel 102 here, a transmissive-type device can also be used.

Specific Example 2

Figure 11:
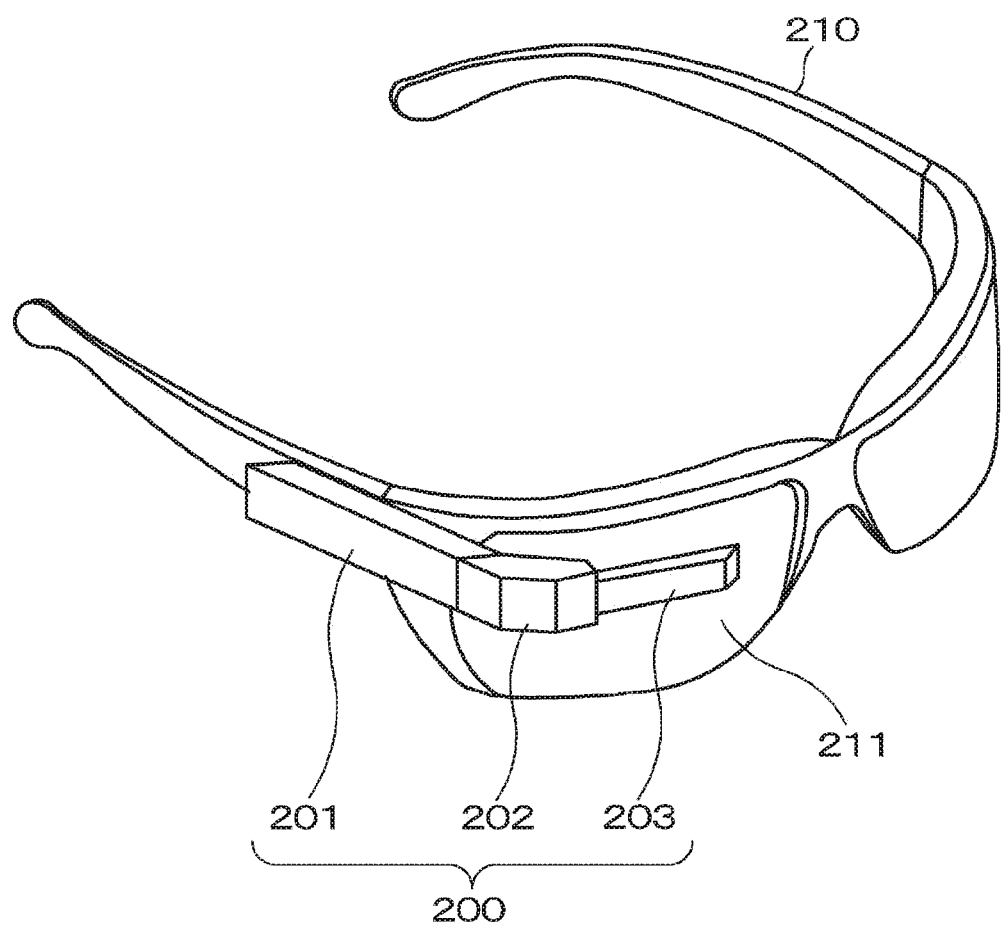
FIG. 11 is an external view illustrating an example of a head mounted display according to Specific example 2 of the electronic apparatus of the present disclosure.

FIG. 11 is an external view illustrating an example of a head mounted display according to Specific example 2 of the electronic apparatus of the present disclosure.

A head mounted display 200 according to the present Specific example 2 has a transmissive head mounted display configuration including a main body section 201, an arm section 202, and a lens barrel 203. The main body section 201 is connected to the arm section 202 and eyeglasses 210. Specifically, an end portion in the long side direction of the main body section 201 is attached to the arm section 202. Furthermore, one side surface of the main body section 201 is connected to the eyeglasses 210 through a connecting member (not illustrated). Note that the main body section 201 may be directly mounted to the head of a human body.

The main body section 201 includes a control board for controlling operation of the head mounted display 200 and a display unit. The arm section 202 supports the lens barrel 203 with respect to the main body section 201 by connecting the main body section 201 and the lens barrel 203. Specifically, the arm section 202 fixes the lens barrel 203 to the main body section 201 by being coupled to the end portion of the main body section 201 and an end portion of the lens barrel 203. Furthermore, the arm section 202 incorporates a signal line for communicating data regarding an image provided from the main body section 201 to the lens barrel 203.

The lens barrel 203 projects image light provided from the main body section 201 via the arm section 202 through a lens 211 of the eyeglasses 210 toward an eye of the user wearing the head mounted display 200. In this head mounted display 200, as the liquid crystal display device according to the present disclosure, that is, the $V_{com}$ inversion drive liquid crystal display device that realizes surface collective driving by using the storage capacitors of two systems can be used as the display unit incorporated in the main body section 201.

<Configurations that Present Disclosure can Take>

Note that the present disclosure can also be configured as follows.

<<A. Display Device>>

[A-1] A liquid crystal display device including:

a liquid crystal unit including a pixel electrode, a counter electrode facing the pixel electrode, and a liquid crystal layer sealed between the pixel electrode and the counter electrode;

a first writing circuit configured to write a positive polarity video signal among video signals whose polarity changes periodically; and a second writing circuit configured to write a negative polarity video signal among the video signals whose polarity changes periodically, the liquid crystal unit, the first writing circuit, and the second writing circuit provided for each pixel, and the first writing circuit and the second writing circuit including transistors having conductivity types different from each other.

[A-2] The liquid crystal display device according to the [A-1], in which a common voltage whose polarity is periodically inverted in synchronization with a positive polarity video signal and a negative polarity video signal is applied to the counter electrode of the liquid crystal unit in common for all the pixels.

[A-3] The liquid crystal display device according to the [A-2], in which the first writing circuit and the second writing circuit include storage capacitors that hold a positive polarity video signal and a negative polarity video signal, respectively.

[A-4] The liquid crystal display device according to the [A-3], in which the first writing circuit and the second writing circuit include first transfer transistors that alternately write a positive polarity video signal and a negative polarity video signal to the storage capacitors, and second transfer transistors that alternately apply held voltages of the storage capacitors to the pixel electrode of the liquid crystal unit, collectively for all the pixels, respectively.

[A-5] The liquid crystal display device according to the [A-4], in which in a case where a liquid crystal mode is a VA mode, each of the first transfer transistor and the second transfer transistor of the first writing circuit includes an N-channel transistor, and each of the first transfer transistor and the second transfer transistor of the second writing circuit includes a P-channel transistor.

[A-6] The liquid crystal display device according to the [A-4], in which in a case where the liquid crystal mode is a TN mode, each of the first transfer transistor and the second transfer transistor of the first writing circuit includes a P-channel transistor, and each of the first transfer transistor and the second transfer transistor of the second writing circuit includes an N-channel transistor.

[A-7] The liquid crystal display device according to the [A-5] or the [A-6], in which a threshold voltage of the first transfer transistor of each of the first writing circuit and the second writing circuit is set to be equal to or lower than a threshold voltage of a voltage-reflectance/transmittance characteristic of liquid crystal.

[A-8] The liquid crystal display device according to the [A-7], in which the first transfer transistor of each of the first writing circuit and the second writing circuit includes a transfer gate in which an N-channel transistor and a P-channel transistor are connected in parallel.

[A-9] The liquid crystal display device according to any one of the [A-1] to the [A-8], in which the liquid crystal unit, the first writing circuit, and the second writing circuit are formed on a semiconductor substrate.

<<B. Electronic Apparatus>>

[B-1] An electronic apparatus including a liquid crystal display device including a liquid crystal unit including a pixel electrode, a counter electrode facing the pixel electrode, and a liquid crystal layer sealed between the pixel electrode and the counter electrode, a first writing circuit configured to write a positive polarity video signal among video signals whose polarity changes periodically, and a second writing circuit configured to write a negative polarity video signal among the video signals whose polarity changes periodically, the liquid crystal unit, the first writing circuit, and the second writing circuit provided for each pixel, and the first writing circuit and the second writing circuit including transistors having conductivity types different from each other.

[B-2] The electronic apparatus according to the [B-1], in which a common voltage whose polarity is periodically inverted in synchronization with a positive polarity video signal and a negative polarity video signal, is applied to the counter electrode of the liquid crystal unit in common for all the pixels.

[B-3] The electronic apparatus according to the [B-2], in which the first writing circuit and the second writing circuit include storage capacitors that hold a positive polarity video signal and a negative polarity video signal, respectively.

[B-4] The electronic apparatus according to the [B-3], in which the first writing circuit and the second writing circuit include first transfer transistors that alternately write a positive polarity video signal and a negative polarity video signal to the storage capacitors, and second transfer transistors that alternately apply the held voltages of the storage capacitors to the pixel electrode of the liquid crystal unit, collectively for all pixels.

[B-5] The electronic apparatus according to the [B-4], in which in a case where a liquid crystal mode is a VA mode, each of the first transfer transistor and the second transfer transistor of the first writing circuit includes an N-channel transistor, and each of the first transfer transistor and the second transfer transistor of the second writing circuit includes a P-channel transistor.

[B-6] The liquid crystal display device according to the [B-4], in which in a case where a liquid crystal mode is a TN mode, each of the first transfer transistor and the second transfer transistor of the first writing circuit includes a P-channel transistor, and each of the first transfer transistor and the second transfer transistor of the second writing circuit includes an N-channel transistor.

[B-7] The electronic apparatus according to the [B-5] or the [B-6], in which a threshold voltage of the first transfer transistor of each of the first writing circuit and the second writing circuit is set to be equal to or lower than a threshold voltage of a voltage-reflectance/transmittance characteristic of liquid crystal.

[B-8] The electronic apparatus according to the [B-7], in which the first transfer transistor of each of the first writing circuit and the second writing circuit includes a transfer gate in which an N-channel transistor and a P-channel transistor are connected in parallel.

[B-9] The electronic apparatus according to any one of the [B-1] to the [B-8], in which the liquid crystal unit, the first writing circuit, and the second writing circuit are formed on a semiconductor substrate.

REFERENCE SIGNS LIST

10 Pixel
20 Pixel array section
30 Scan line drive unit
40 Signal line drive unit
51($51_1$ to $51_m$) Scan line
52($52_1$ to $52_m$) Signal line
60 Liquid crystal unit (liquid crystal element)
61 Pixel electrode
62 Counter electrode (Common electrode)
63 Liquid crystal layer
$70_1$ First writing circuit
$70_2$ Second writing circuit
$71_{1\_n}$, $71_{2\_p}$ First transfer transistor
$72_1$, $72_2$ Storage capacitor
$73_{1\_n}$, $73_{2\_p}$ Second transfer transistor

The invention claimed is:

1. A liquid crystal display device, comprising:
a liquid crystal unit including
a pixel electrode on a semiconductor substrate,
a counter electrode on a transparent substrate,
a liquid crystal layer sealed between the pixel electrode and the counter electrode,
a first alignment layer between the counter electrode and the liquid crystal layer, and
a second alignment layer between the pixel electrode and the liquid crystal layer, wherein
the counter electrode faces the pixel electrode,
the pixel electrode is a reflective electrode,
the counter electrode is a transparent electrode,
a common voltage is applied to the counter electrode, and
the common voltage is common for each pixel of a plurality of pixels;
a first writing circuit, wherein
in a vertical alignment (VA) mode of the liquid crystal unit, the first writing circuit includes
a first N-channel transistor,
a second N-channel transistor, and
a first storage capacitor between the first N-channel transistor and the second N-channel transistor, and
the first N-channel transistor is configured to write, to the first storage capacitor, a positive polarity video signal among a plurality of video signals whose polarity changes periodically; and
a second writing circuit, wherein
in the VA mode of the liquid crystal unit, the second writing circuit includes
a first P-channel transistor,
a second P-channel transistor, and
a second storage capacitor between the first P-channel transistor and the second P-channel transistor,
the first P-channel transistor is configured to write, to the second storage capacitor, a negative polarity video signal among the plurality of video signals whose polarity changes periodically,
the liquid crystal unit, the first writing circuit, and the second writing circuit correspond to each pixel of the plurality of pixels, and
a polarity of the common voltage is periodically inverted in synchronization with the positive polarity video signal and the negative polarity video signal.

2. The liquid crystal display device according to claim 1, wherein
the first storage capacitor is configured to store the positive polarity video signal, and
the second storage capacitor is configured to store the negative polarity video signal.

3. The liquid crystal display device according to claim 2, wherein
the first N-channel transistor and the first P-channel transistor are configured to alternately write the positive polarity video signal and the negative polarity video signal to the first storage capacitor and the second storage capacitor, respectively, and
the second N-channel transistor and the second P-channel transistor are configured to alternately apply held voltages of the first storage capacitor and the second storage capacitor to the pixel electrode of the liquid crystal unit, collectively for each pixel of the plurality of pixels.

4. The liquid crystal display device according to claim 3, wherein in a twisted nematic (TN) mode of the liquid crystal unit,
the first writing circuit includes the first P-channel transistor and the second P-channel transistor, and
the second writing circuit includes the first N-channel transistor and the second N-channel transistor.

5. The liquid crystal display device according to claim 1, wherein a threshold voltage of each of the first N-channel transistor and the first P-channel transistor is equal to or lower than a threshold voltage of a voltage-reflectance/transmittance characteristic of liquid crystal.

6. The liquid crystal display device according to claim 5, wherein
the first writing circuit further includes a first transfer gate in which the first N-channel transistor is connected in parallel with a third P-channel transistor, and the second writing circuit further includes a second transfer gate in which the first P-channel transistor is connected in parallel with a third N-channel transistor.

7. The liquid crystal display device according to claim 1, wherein the liquid crystal unit, the first writing circuit, and the second writing circuit are on the semiconductor substrate.

8. An electronic apparatus, comprising:
a liquid crystal display device including:
   a liquid crystal unit including
      a pixel electrode on a semiconductor substrate,
      a counter electrode on a transparent substrate,
      a liquid crystal layer sealed between the pixel electrode and the counter electrode,
      a first alignment layer between the counter electrode and the liquid crystal layer, and
      a second alignment layer between the pixel electrode and the liquid crystal layer, wherein
         the counter electrode faces the pixel electrode,
         the pixel electrode is a reflective electrode,
         the counter electrode is a transparent electrode,
         a common voltage is applied to the counter electrode, and
         the common voltage is common for each pixel of a plurality of pixels;
   a first writing circuit, wherein
      in a vertical alignment (VA) mode of the liquid crystal unit, the first writing circuit includes
         a first N-channel transistor,
         a second N-channel transistor, and
         a first storage capacitor between the first N-channel transistor and the second N-channel transistor, and
      the first N-channel transistor is configured to write, to the first storage capacitor, a positive polarity video signal among a plurality of video signals whose polarity changes periodically; and
   a second writing circuit, wherein
      in the VA mode of the liquid crystal unit, the second writing circuit includes
         a first P-channel transistor,
         a second P-channel transistor, and
         a second storage capacitor between the first P-channel transistor and the second P-channel transistor,
      the first P-channel transistor is configured to write, to the second storage capacitor, a negative polarity video signal among the plurality of video signals whose polarity changes periodically,
      the liquid crystal unit, the first writing circuit, and the second writing circuit correspond to each pixel of the plurality of pixels, and
      a polarity of the common voltage is periodically inverted in synchronization with the positive polarity video signal and the negative polarity video signal.

* * * * *